(12) United States Patent
LaFond

(10) Patent No.: US 7,350,415 B2
(45) Date of Patent: Apr. 1, 2008

(54) CLOSED-LOOP COMB DRIVE SENSOR

(75) Inventor: Peter LaFond, Redmond, WA (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 11/420,401

(22) Filed: May 25, 2006

(65) Prior Publication Data

US 2007/0272017 A1  Nov. 29, 2007

(51) Int. Cl.
*G01P 15/125* (2006.01)
*G01C 19/56* (2006.01)
(52) U.S. Cl. .............................. 73/514.32; 73/504.14
(58) Field of Classification Search ..............................
73/504.12–504.16, 504.02, 504.03, 504.04,
73/514.32, 514.36, 514.38, 514.16, 514.29

See application file for complete search history.

(56) References Cited

U.S. PATENT DOCUMENTS

| | | | |
|---|---|---|---|
| 5,895,851 A * | 4/1999 | Kano et al. | 73/504.04 |
| 6,910,379 B2 * | 6/2005 | Eskridge et al. | 73/504.14 |
| 7,051,590 B1 * | 5/2006 | Lemkin et al. | 73/504.04 |

* cited by examiner

*Primary Examiner*—Helen Kwok
(74) *Attorney, Agent, or Firm*—Black Lowe & Graham PLLC

(57) ABSTRACT

A closed-loop, comb drive device that reduces certain "common mode" sensor errors. The device includes a comb structure, electronics, a substrate, and a position sensor. The comb structure includes two comb-drive sections, each having at least two subsections. The comb drive sub-sections in each section are positioned in a diagonal relationship to each other relative to the device axes. A separate pick-off section, along with the electronics, determine which of the two drive sections should receive a voltage differential, and the size of that differential. The diagonal relationship within each drive section eliminates many of the large scale factor errors which often occur in prior-art designs.

10 Claims, 2 Drawing Sheets

CLOSED-LOOP COMB DRIVE SENSOR

BACKGROUND OF THE INVENTION

Accelerometers, pressure sensors, and other devices sometimes use electrostatic comb drives to provide feedback-force in a closed-loop configuration. The drive consists of one or more sections of lateral comb teeth pairs. Each pair has a tooth attached to a moveable proof mass (accelerometer) or diaphragm (pressure sensor) and another tooth attached to a fixed frame. Since an electrostatic force between the teeth pairs is always attractive, the variety of ways to configure the comb teeth is limited. In an accelerometer, a common way to structure the drive of the device is to have two drive sections, one to provide the feedback force for positive input and one for negative input. One of the two drive sides would be on each side of a centerline, see FIG. 1, which represents current-art. A common problem that occurs in current-art devices is that the gaps between the fixed and moveable teeth don't remain constant, over time and/or through environmental inputs, and thus the electrostatic force, which is inversely proportional to the square of the gap, also will vary. In closed-loop operation, a change in the gap results in a change in the applied differential voltage across the gap necessary to balance the inertial force on the proof mass. This voltage is used as the indicator of the sensed acceleration, and thus, an apparent change in acceleration occurs. This is seen as an error in the instrument's scale factor. For example, if the gap increases by 1%, then the instrument's scale factor will increase by about 2% (a 2% error). Gap variation may be caused by environments such as temperature variation, shock, or long-term storage. For example, if the proof mass and all the teeth are made of Silicon but the fixed teeth are attached to a frame made of another material, e.g., glass, then a temperature change will cause the fixed and moveable teeth to expand at different rates and move relative to one another. Generally, the geometric center of both the moveable teeth on the proof mass and the fixed teeth attached to the glass will remain coincident, but each will expand radially at different rates. The further from the geometric center that a tooth pair gap is located, the greater the rate of change of that gap with temperature, and thus the greater the effect on the instrument scale factor.

Therefore, there exists a need for a comb drive configuration, which acts to remove this source of error.

SUMMARY OF THE INVENTION

The present invention provides a closed-loop, comb drive device. The device includes a lateral comb-drive structure, a proof mass or diaphragm, a controller and other electronics typically included in a closed-loop system, a substrate, and a proof mass position-sensing means. The comb structure includes two comb drive sections, each having at least two subsections. One section provides force-feedback for positive input; the other for negative input. The comb drive subsections in a section are positioned in a diagonal relationship to each other relative to the instrument axes.

The electronics, along with a proof mass position-sensing means, determines which of the sections is required to pull the proof mass towards its null position. It does this by applying a differential voltage to the proper comb section. The voltage applied is used as an indication of the input acceleration.

In the silicon/glass example above, suppose the expansion rate of silicon were higher than that of glass, and that the temperature were raised. In the prior art of FIG. 1, the moveable silicon teeth would expand radially at a greater rate than the fixed teeth attached to the glass. This would cause all the positive-side and negative side gaps to decrease. Whichever side is providing the re-balance force, the effect of the smaller gaps is to lower the required voltage differential, thus lowering the scale factor. Looking at the positive side teeth (52 and 48) of the present invention (FIG. 2), it's clear, that with increasing temperature, the 48 teeth gaps will increase while the 52 teeth gaps will decrease. Thus, the error present in prior art is removed by turning it into a common mode error.

BRIEF DESCRIPTION OF THE DRAWINGS

The preferred and alternative embodiments of the present invention are described in detail below with reference to the following drawings.

DETAILED DESCRIPTION OF THE PREFERRED EMBODIMENT

Figure 1:
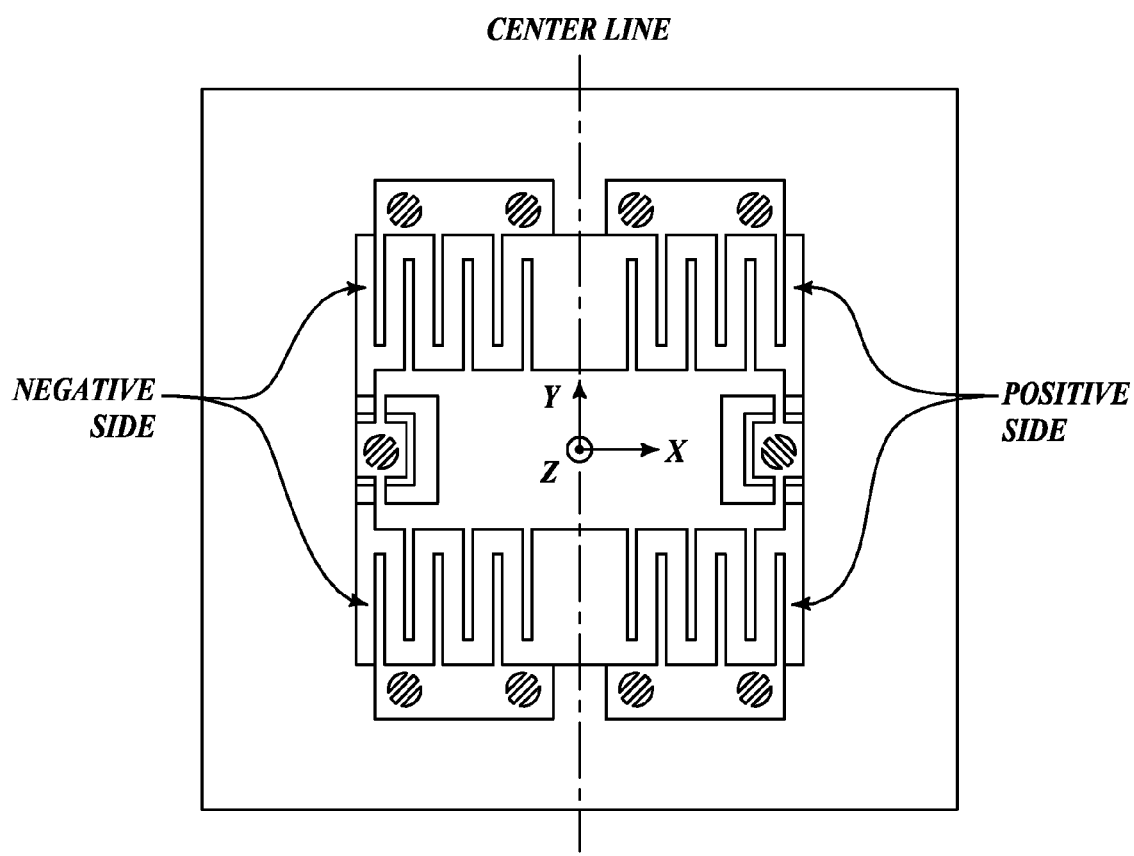
FIG. 1 illustrates a top view of an example comb drive sensor formed in accordance with the prior art.
Figure 2:
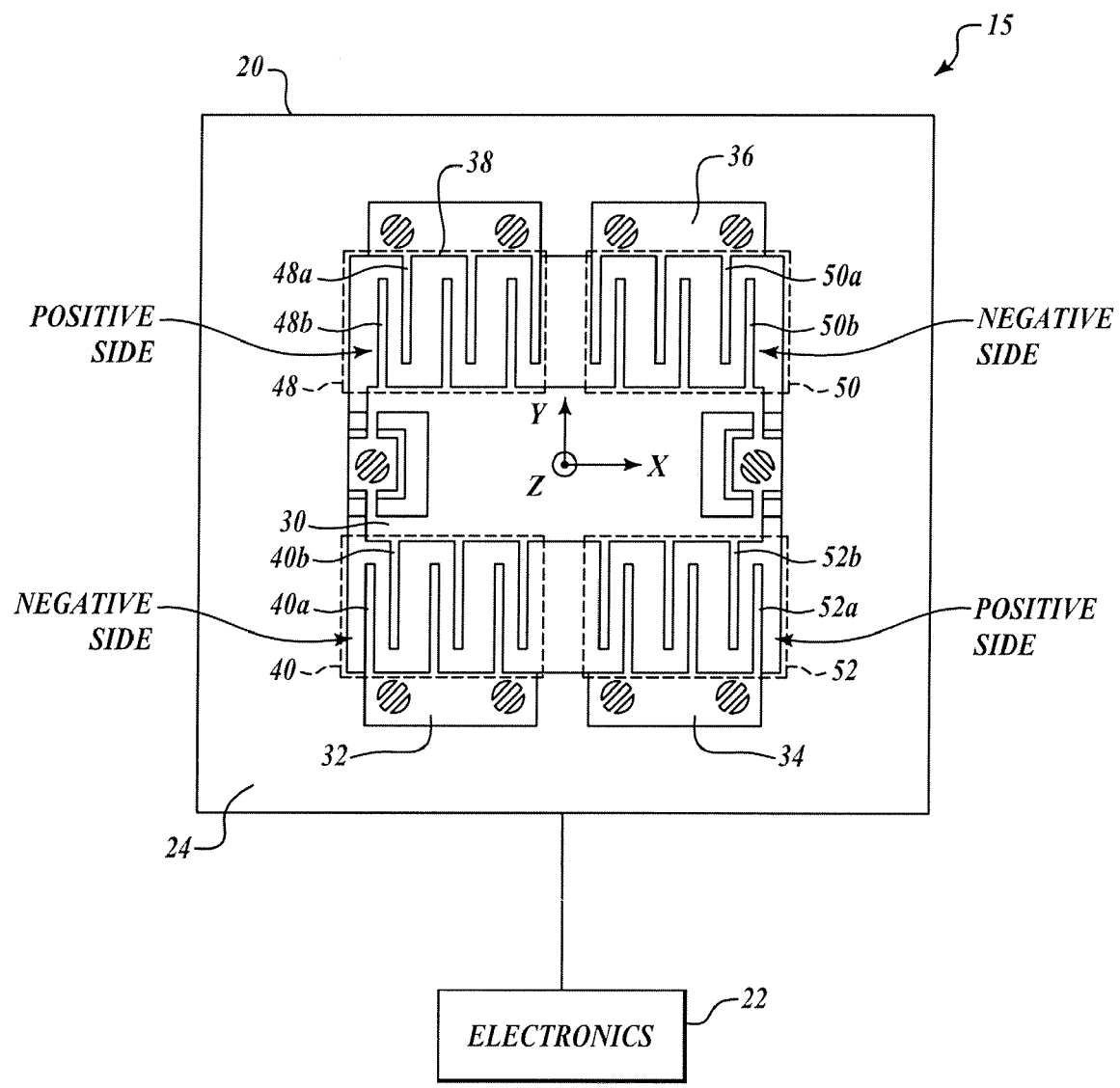
FIG. 2 illustrates a comb drive sensor system formed in accordance with the embodiment of the present invention.

The present invention provides a force-feedback comb drive. FIG. 2 illustrates an example of a comb drive sensor system 15 formed in accordance with an embodiment of the present invention. The system 15 includes a comb drive device 20, (an accelerometer is shown) that is connected to electronics 22. The electronics 22 determines the voltage that is applied to the device 20 by receiving signals from various components of the device 20. In a closed-loop configuration, the electronics 22 provides a voltage signal to the device 20 to hold a diaphragm or proof mass 30 of the device 20 at its null position, in response to pressure or inertial forces. The proof mass 30 is connected to the substrate 24 at flexures. The flexures allow the proof mass 30 to move in response to inertial forces along the X-axis.

In this example, the device 20 includes four sections of comb teeth 40, 48, 50, 52. Each of the four sections 40, 48, 50, 52 includes one or more pairs of the teeth, such as teeth 40a and 40b in the section 40. Each of the teeth 40b, 48b, 50b, 52b extending from the proof mass 30 is paired up with fixed teeth 40a, 48a, 50a, 52a that extend from a substrate 24 via respective pads 32, 38, 36, 34. The teeth 40a, 48a, 50a, 52a may extend directly from the substrate 24.

Each tooth 40b and 52b that extends from a first side of the proof mass 30 is located inboard the paired fixed teeth 40a and 52a, respectively. On a second side of the proof mass 30, each tooth 48b and 50b is located outboard of the paired fixed tooth 48a and 50a, respectively.

The fixed teeth in a first section are electrically coupled to the fixed teeth in a second section that is diagonally located from the first section. Thus, the teeth 50a receive the same differential voltage that the teeth 40a receive. The same goes for the teeth 48a and 52a.

If a positive X-axis acceleration is applied to the device 20, the proof mass moves slightly in the negative X direction relative to the fixed teeth. A separate "pick-off" section of the device (not shown in the figures) senses this relative motion and feeds this information to the electronic 22. The electronics 22 then determines what electrostatic force (i.e., voltage value) is required to reposition the proof mass 30 to its null position and which set of diagonal sections of teeth to drive, in order to create the required electrostatic re-balance force. In this example, the determined voltage value is applied to the teeth 48a and 52a, causing an attractive electrostatic forces between the teeth 48a and 48b and the teeth 52a and 52b. The other fixed teeth 40a and 50a receive a voltage value from the electronics 22 that matches that of their associated teeth 40b and 50b.

Because the teeth that produce the electrostatic forces are diagonal to each other, the moment on the proof mass 30 due to the two forces add to zero. This is desirable so as not to drive a rotational mode in the XY plane of the proof mass 30.

This causes scale factor errors caused by external factors such as temperature and shock, and internal factors such as residual stresses, to become common mode errors. A common mode error is one, which is composed of two equal and oppositely-signed parts so that the net effect is zero; a cancellation takes place. In this case, a common mode error is created by having half of a drive section on either side of the centerline with an anti-symmetric fixed/moveable relation. The increase in feedback-force from one half (from shrunk gaps due to temperature change, for example) is offset by the decrease in force from the half with increased gaps.

While the preferred embodiment of the invention has been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

The embodiments of the invention in which an exclusive property or privilege is claimed are defined as follows:

1. A comb drive device comprising:
    a position sensing device;
    a substrate;
    a force sensing device including first and second edges and first and second ends, the force sensing device being coupled to the substrate and being in electrical communication with the position sensing device; and
    four groups of at least one pair of teeth,
    wherein the at least one pair of teeth in a first group comprising:
        a first tooth extending from the substrate; and
        a second tooth extending from the first edge of the force sensing device near the first end to form a capacitive gap with the first tooth, the first tooth being closer to the first end than the second tooth along a longitudinal axis;
    wherein the at least one pair of teeth in a second group comprising:
        a first tooth extending from the substrate; and
        a second tooth extending from the second edge near the second end to form a capacitive gap with the first tooth, the second tooth being closer to the second end than the second tooth along the longitudinal axis;
    wherein the at least one pair of teeth in a third group comprising:
        a first tooth extending from the substrate; and
        a second tooth extending from the first edge near the second end to form a capacitive gap with the first tooth, the first tooth being closer to the second end than the second tooth along the longitudinal axis;
    wherein the at least one pair of teeth in a four group comprising:
        a first tooth extending from the substrate; and
        a second tooth extending from the second edge near the first end to form a capacitive gap with the first tooth, the second tooth being closer to the first end than the first tooth along the longitudinal axis;
    wherein the first teeth of the first and second group being electrically coupled to the position sensing device for receiving a substantially identical signal, and
    wherein the first teeth of the third and fourth group being electrically coupled to the position sensing device for receiving a substantially identical signal.

2. The device of claim 1, wherein the force sensing device is a proof mass.

3. The device of claim 1, wherein the force sensing device is a pressure sensor.

4. The device of claim 1, wherein the position sensing device determines which of the pairs of groups experienced expanding gaps between the pairs of teeth, determines a force required to move the force sensing device to a predefined location, generates a signal based on a determined force, and sends the generated signal to the first teeth of the determined pairs of groups experiencing expanding gaps between the pairs of teeth.

5. The device of claim 4, wherein the predefined location is a null position of the force sensing device.

6. A comb drive method comprising:
    determining which of two pairs of comb drive groups having at least one pair of teeth are experiencing expanding gaps between the pairs of teeth, each of the at least one pair of teeth in the comb drive groups having a first tooth coupled to a force sensing device and a second tooth coupled to a substrate;
    determining a force required to move the force sensing device to a predefined location;
    generating a signal based on the determined force; and
    sending the generated signal to the first tooth of the determined pairs of groups experiencing expanding gaps between the pairs of teeth,
    wherein each of the comb drive groups in a pair being position in a diagonal relationship to each other relative to the force sensing device.

7. The method of claim 6, wherein the at least one pair of teeth in a first comb drive group of a first pair of comb drive groups comprises:
    a first tooth extending from the substrate; and
    a second tooth extending from a first edge of the force sensing device near a first end to form a capacitive gap with the first tooth, the first tooth being closer to the first end than the second tooth along a longitudinal axis;
    wherein the at least one pair of teeth in a second comb drive group of the first pair of comb drive groups comprises:
        a first tooth extending from the substrate; and
        a second tooth extending from a second edge of the force sensing device near a second end to form a capacitive gap with the first tooth, the second tooth being closer to the second end than the first tooth along the longitudinal axis;
    wherein the at least one pair of teeth in a first comb drive group of a second pair of comb drive groups comprises:
        a first tooth extending from the substrate; and
        a second tooth extending from the first edge near the second end to form a capacitive gap with the first tooth, the first tooth being closer to the second end than the second tooth along the longitudinal axis;

wherein the at least one pair of teeth in a second comb drive group of the second pair of comb drive groups comprises:
a first tooth extending from the substrate; and
a second tooth extending from the second edge near the first end to form a capacitive gap with the first tooth, the second tooth being closer to the first end than the first tooth along the longitudinal axis;
wherein the first teeth of the first and second groups of the first pair of comb drive groups are electrically coupled to a controller for receiving the same signal, and
wherein the first teeth of the first and second groups of the second pair of comb drive groups are electrically coupled to the controller for receiving the same signal.

8. The method of claim 7, wherein the force sensing device is a proof mass.

9. The method of claim 7, wherein the force sensing device is a pressure sensor.

10. The method of claim 6, wherein the predefined location is a null position of the force sensing device.

* * * * *